US005478538A

United States Patent [19]

Hollitt et al.

[11] Patent Number: 5,478,538

[45] Date of Patent: Dec. 26, 1995

[54] REMOVAL OF RADIOACTIVITY FROM ZIRCON

[75] Inventors: Michael J. Hollitt; Ross A. McClelland; Matthew J. Liddy, all of South Melbourne; Ian E. Grey, Port Melbourne, all of Australia; Christopher A. Fleming, Lakefield, Canada

[73] Assignee: Wimmera Industrial Minerals Pty Ltd, South Melbourne, Australia

[21] Appl. No.: 133,209

[22] PCT Filed: Nov. 15, 1992

[86] PCT No.: PCT/AU92/00168

§ 371 Date: Dec. 14, 1993

§ 102(e) Date: Dec. 14, 1993

[87] PCT Pub. No.: WO92/18985

PCT Pub. Date: Oct. 29, 1992

[30] Foreign Application Priority Data

Apr. 15, 1991 [AU] Australia .............................. PK 5586

[51] Int. Cl.[6] .................................................. C01G 43/00

[52] U.S. Cl. .................................. 423/2; 423/20; 423/80; 423/84; 423/3

[58] Field of Search .................................. 423/3, 20, 82, 423/84, 249, 2

[56] References Cited

U.S. PATENT DOCUMENTS

| | | | |
|---|---|---|---|
| 2,036,220 | 4/1936 | Kinzie | 423/80 |
| 2,294,431 | 9/1942 | Wainer | 423/73 |
| 2,387,046 | 10/1945 | Wainer | 423/73 |
| 2,578,748 | 12/1951 | Schoenlaub | 423/82 |
| 2,721,117 | 10/1955 | Schoenlaub | 423/71 |
| 3,389,005 | 6/1968 | Kloepfer et al. | 106/450 |
| 3,413,082 | 11/1968 | Owens | 423/21.1 |
| 3,832,441 | 8/1974 | Schoenlaub | 423/71 |
| 4,067,953 | 1/1978 | Roux et al. | 423/80 |
| 4,268,485 | 5/1981 | Keneke et al. | 423/3 |
| 5,039,336 | 8/1991 | Feuling | 75/419 |
| 5,051,165 | 9/1991 | Andrews | 209/166 |

OTHER PUBLICATIONS

T. E. Krogh, "A low-contamination method for hydrothermal decomposition of zircon and extraction of u and Pb for isotopic age determinations", Geochimica et Cosmochimica Acta, 1973, vol. 37, pp. 485–494.

*Primary Examiner*—Ngoclan Mai
*Attorney, Agent, or Firm*—Workman Nydegger Seeley

[57] ABSTRACT

The specification discloses a process for removing radionuclides from zircon. The process involves thermally decomposing the zircon in the presence of suitable additives, extracting the radionuclides chemically and recovering zirconia and silica. Suitable additives include fluxes, silica and any oxide capable of forming a silicate with silica when heated. Chemical treatments disclosed include leaching with mineral acids and strong organic acids. Methods of stabilizing the radionuclides extracted by leaching are also disclosed. One method involves spray roasting. Another method involves neutralization of leach liquor and recovery of radionuclide solids by filtration or other suitable liquid/solid separation techniques.

27 Claims, No Drawings

REMOVAL OF RADIOACTIVITY FROM ZIRCON

This invention relates to a treatment for partial removal of radioactive components from concentrates of zircon.

In a particular embodiment the present invention provides a process for the removal of all or part of the radionuclides contained in zircon concentrates. In a general aspect the process of the invention comprises three basic steps, namely:

1. A thermal treatment step which at least in part decomposes the zircon;
2. A sequence of chemical treatments for lixiviation of radionuclides contained in the thermally treated zircon: and
3. Phase separation for effective removal of the radionuclides from the zircon.

Additional steps may be employed as will be described below.

All commercially available zircons contain radioactivity, in the form of uranium-238 and thorium-232 radionuclides in the zircon lattice, and their respective radioactive progeny elements. The significance of the progeny elements formed by radioactive decay of the parent radionuclides is that for each radioactive decomposition of a parent there will ultimately follow a chain of decomposition until stable elements, subject to no further decomposition, are formed. In the case of thorium-232 effectively nine further decompositions follow the initial decomposition while thirteen further decompositions follow the initial decompositions of uranium-238. Commercially available zircons typically are of sufficient age from formation in original host rocks to allow establishment of "secular equilibrium", at which all radioactive progeny elements express the same rate of decomposition as the parent radionuclides. Under such circumstances the rate of radionuclide decomposition, i.e. the radioactivity of the zircon, is the sum of: the rate of decompositions of each parent multiplied by the number of effective decompositions in the decomposition chain of the parent. That is, the decay chain acts as a multiplier for the radioactivity of the parents.

A large proportion of commercially produced zircon concentrates enters ceramics products in the form of glazes and pacifiers. As a prior treatment for the production of frits or for direct use in glazes and porcelain, zircon is milled in order to improve its incorporation into the various ceramics applications. Such milling, to produce at least a portion of ultra fine (sub-micron) material in the size distribution, results in dust arising either in the dry milling of the zircon or in drying of the wet milled zircon and in subsequent handling of the milled product.

The use of zircon having the typical low level of radioactivity associated with commercially available zircons can be shown to pose potential health risks. Inhalation of fine zircon dusts results in retention of particles within the lungs of those exposed to dust laden air. Partial dissolution of radionuclides from these particles in body fluids can result in distribution of alpha radiation to areas within the body where radiological damage can occur.

Table 1 provides an analysis of the rate of radioactive decomposition (1 decomposition per second is known as a Becquerel, Bq) associated with radioactive elements present within a range of commercially available zircons. Also included in Table 1 is an assessment of the level of 0.1 micron dust in the breathing environment which would result in exposure to alpha radiation at greater than the limits for exposure recommended by the International Council for Radiological Protection (ICRP) of 1 mSv (milli Sieverts) per annum for members of the public and 5 mSV per annum for general workers. In most workplaces handling of milled products will result in areas of plant having dust levels in excess of 1.0 mg $m^{-3}$.

It is clear from Table 1 that milling of zircon and handling of milled and micronised zircon represents a significant potential health risk to workers for virtually all commercially available zircons.

TABLE 1

Analysis and Behaviour in Milling of Commercially Available Zircons

| | A | B | C | D |
|---|---|---|---|---|
| $ZrO_2$ + HfO2 | 65.9 | 66.1 | 66.3 | 66.4 |
| $SiO_2$ | 31.4 | 32.3 | 33.0 | 32.3 |
| $Fe_2O_3$ | 0.080 | 0.040 | 0.052 | 0.021 |
| $Al_2O_3$ | 0.12 | 0.08 | 0.29 | 0.20 |
| $U_3O_8$ | 0.0471 | 0.0330 | 0.0436 | 0.0351 |
| $ThO_2$ | 0.0281 | 0.0160 | 0.0163 | 0.0116 |
| Total Radioactivity (Bq/g) | 79.0 | 52.56 | 69.85 | 55.6 |
| Alpha Activity (Bq/g) | 45.1 | 38.8 | 39.7 | 31.6 |
| Maximum Level of 0.1 μm Dust (Public Exposure to give 1 mSv/annum) mg $m^{-3}$ | 0.034 | 0.052 | 0.043 | 0.055 |
| Maximum level of 0.1 μm Dust (Worker Exposure to give 5 mSv/annum) mg $m^{-3}$ | 0.753 | 1.15 | 0.93 | 1.19 |

Further, some commercial zircons exceed the International Atomic Energy Agency recommended limit of 70 Bq per gram for radioactive labelling for transportation purposes, while many other zircons approach this limit.

Prior art attempts at the removal of radioactives from zircon have met with very limited success. All attempts have involved the direct use of mineral and organic acids in aqueous solution for leaching of radionuclides. In one attempt reported in the prior art, leaching with acetic, hydrochloric and nitric acid was found to be effective in reducing immediate beta radioactivity by up to 36%. However, it is not clear to what extent such reduction was sustained over time, as removal of only short lived beta emitting progeny elements would result in fast re-establishment of the original levels, as such progeny are regenerated by decay of the parent elements.

In other prior art some removal of uranium and thorium has been achieved when treating zircon for removal of surface coatings containing iron and organic matter in order to achieve prime grades. Hence it is known that treatment with concentrated sulphuric acid (e.g. at 150° C.) has resulted in 28% removal of uranium and 47% removal of thorium. The effect on the residual level of radioactivity is unknown, however, as progeny deportment has not been assessed. Since the main contribution to radioactivity comes from progeny elements of uranium rather than thorium, significantly higher removal than observed of the entire uranium progeny chain would be required for effective reduction in the level of radioactivity.

It is well known that uranium and thorium can be accommodated structurally within the zircon crystal lattice, and that zircon acts as a receptor for uranium during magmatic crystallisation to form zircon bearing rocks. Zircons are also often compositionally banded due to exsolution of thorium rich material after primary crystallisation. Thorium rich bands then suffer radiation damage over geological time, causing local decomposition of the zircon lattice in a process known as metamictisation. Volume changes occurring during metamictisation result in propagation of cracks across zircon crystals. These cracks allow acidic reagents to gain access to metamict zones, resulting in local removal of thorium and some uranium. However, the high stability of the bulk zircon lattice limits removal of radioactives in this manner, particularly of uranium and its progeny radionuclides.

Thermal treatments have previously been successfully applied in the decomposition of zircon, with the aim of recovery of zirconia after subsequent treatment for separation of zirconia from silica contained in the zircon. Such thermal treatments have included roasting with sulphuric acid, roasting with lime, limestone or dolomite, plasma dissociation, roasting with fluorosilicates, and chlorination roasting. These treatments have never been commercially applied with the intention of recovery of original silica in the zircon with the zirconia products, however.

The ability to thermally decompose zircon and recover virtually all associated zirconia and silica in a single product has never been reported. Indeed there would be limited motivation for the development of such an ability in the absence of an incentive based on the removal of deleterious impurities, such as radioactives.

The deportment of radioactives in the reported zircon treatment processes for the recovery of zirconia has never been indicated, if it has been measured at all.

Zirconia and zirconium chemicals production represent less than 10% of the world's demand for zircon. The value addition associated with these uses easily justifies the expenditures on plant and equipment, chemicals and other consumable required for zircon decomposition and silica removal. However, the largest demand for zircon is for applications which use the mineral directly, although possibly in milled form. In the context of the need to establish a method for removal of radioactives from zircon and the apparent need to decompose the zircon lattice in order to achieve such removal, there is an incentive to develop techniques for decomposition which do not remove silica, especially since in many ceramics applications silica is a desirable constituent.

The lack of value addition associated with silica removal in large markets would recommend that silica removal, with its associated high chemical expense, should not be pursued.

There is thus a need for a process which:

1. Decomposes the zircon lattice with minimal reagent consumption.
2. Allows for removal of radioactives from the decomposed zircon lattice.
3. Does not consume reagents or otherwise incur expense in the unnecessary removal of silica.

Accordingly the present invention provides a process for reducing the content of radioactive components in a zircon concentrate which process comprises the steps of:

(i) heating the zircon concentrate in the presence of an additive and under conditions that are capable of causing the zircon concentrate to at least partially decompose;

(ii) cooling the product of step (i);

(iii) subjecting the product of step (ii) to a chemical treatment for removing at least a portion of the radioactive components present in the product of step (ii) but without necessarily significant removal of silica or zirconia; and (iv) recovering zirconia and silica from the product of step (iii).

The above steps may optionally be followed by one or more of the following steps:

(v) washing the product of step (iv);

(vi) drying and calcining the product of step (v) for removal of retained moisture and production of a dry powdered product having a significant reduction in the level of radioactivity;

(vii) regeneration of acid and/or stabilisation of separated radionuclides in a solid waste form.

In the process, additives which have the effect of encouraging the thermal decomposition of zircon to alternative phases may be added to the zircon.

Such additives may include but not be limited to any metal oxide which exhibits a chemical preference for the formation of compounds or liquids with silica over zirconia, or any compound which decomposes to a metal oxide or any other additive having the same effect. In particular, oxides of elements which are classified as being in Groups I and II of the Periodic Table (i.e. alkali and alkali earth elements) have been found to be effective, although many other silicate forming oxides will have a similar effectiveness. A range of other additives may also be beneficial. For example, silica itself and a range of fluxes may be useful additives. Additives may be used in combination. Compounds of additives may be used in place of mixtures of additives. Mineral species may be used as the source of one or more desired additive.

The temperature of the thermal treatment may be from 800° up to 1800° C. depending on the additives used and the method of additive incorporation. Thermal treatment may produce a product which consists in part of a liquid phase at the temperature of thermal processing or may be entirely solid phase. The presence of a small amount of liquid phase has been found to be beneficial in reducing the time required for completion of reactions in thermal processing. Thermal treatment may be under any gaseous atmosphere conditions, including fully oxidised or strongly reducing.

Feed preparation for thermal treatment may range from direct mixing with additives prior to charging to thermal treatment, through the formation of agglomerates or nodules of mixed products, to briquette production from zircon and additives. The method chosen will depend on the physical properties of the zircon and the additives chosen. Solid fuel such as coal and coke may also be charged into the thermal treatment step.

Thermal treatment may be carried out in any suitable device, including fluidised beds, stationary grate and rotary kilns and plasma flames and furnaces. The presently preferred apparatus is a rotary kiln due to its ability to easily accommodate liquid phases and operate over wide ranges of maximum temperature.

The degree of conversion of zircon to other phases in thermal treatment may be dependent on the level of additive addition, which in turn will depend on the desired degree of reduction in the level of radioactivity and the desired chemistry of the final product. Typically less than 20% by weight of the additive is required for maximum removal. For some additives only 10% by weight will result in maximum removal. For most purposes additive levels of between 5 and 15 wt % as oxides will be suitable. The actual level of additive will be determined by economic considerations and product chemistry as well as the desired degree of removal of radioactives. Under some circumstances the weight of additives may be several times the zircon weight.

Thermal treatment residence time at temperature will depend on the nature of the additive and the operating temperature. Residence times from 30 minutes to five hours have been found to be effective.

Cooling of the thermally treated zircon may be conducted in any suitable cooling device, including fluidised bed cooling or cooling in a water cooled rotary cooler. Cooling may also be conducted by direct quenching with water sprays.

Following cooling to a suitable temperature (e.g. less than 300° C.) the treated zircon is submitted to a series of chemical treatments for removal of radioactives and possibly selective removal of additives. The most suitable chemical treatment is leaching with a mineral or organic acid. Prior to leaching the roasted product may be crushed or ground, depending on roasting pretreatment, in order to provide a size consist suitable for the leaching stage. Leaching may be conducted in a suitable batch or continuous leach vessel.

For example, heated, agitated vessels or fluidised bed vessels may be used. Typically the leaching temperature will be 20°–150° C., depending on the additive and the leachant. Pressure leaching may also be employed. Leaching time may be from 10 minutes to 10 hours, depending on the nature of the additive, the temperature and time of thermal treatment and the chosen leachant and its concentration and temperature.

Any acid may be used in acid leaching, although hydrochloric acid, nitric acid and strong organic acids are preferred. Sulphuric acid will not be expected to remove radium nuclides effectively but may still be used for removal of other radionuclides. Acid leaching may be conducted batchwise or continuously and may consist of several stages, operated either separately, or with countercurrent flow of solids and liquids between stages. Effectively complete removal of additives without significant removal of zirconia or silica can be achieved, although complete removal of additives is not necessary for effective reduction in radioactivity.

At the conclusion of leaching the leach liquor may be separated from the mineral by any suitable means, including thickening, filtration and washing. The mineral product may then be dried and calcined for removal of moisture and chemically combined water by any suitable means.

Calcination at temperatures in the range 300° C.–900° C. has been found to be effective for complete removal of volatile matter from the leached product.

Other chemical treatments for solubilisation of additives and radioactives in roasted products prior to leaching may also be applied. For example chlorination or hydrochlorination prior to leaching have been found to be effective in this regard.

In a particular embodiment of the present disclosure it has been discovered that the addition of additives to zircon which result in partial breakdown of the zircon lattice in thermal processing without the formation of a zirconia phase assists in the removal of uranium and thorium during leaching. The deportment of uranium and thorium oxides into zirconia phases, as presently disclosed, and the resistance of these phases to leaching, limits removal under circumstances where zirconia phases are formed. Zirconia can be avoided as a separate phase by careful selection of additives, especially under circumstances where the final product of the disclosed process does not need to have a composition close to that of the original zircon (for example, where the product is destined for ceramics applications).

Additive regimes where significant proportions of zirconia phases can be avoided include addition of sufficient silica bearing additive to consume zirconia which would otherwise form, by the formation of secondary zircon. While silica addition is most beneficial, as silica is a common component of ceramics which use zirconia products, and is readily available and inexpensive, most additives which prevent the formation of zirconia will have similar beneficial impact.

In a further embodiment of the present disclosure it has been discovered that calcium oxide bearing additives (e.g. lime, hydrated lime and wollastronite) provide the benefit of a high degree of zircon decomposition in thermal processing per unit of additive. This is because a calcium zircosilicate phase of composition $2Ca0 \cdot ZrO_2 \cdot 4SiO_2$ can be formed under the conditions of the disclosed thermal processing step. This phase consumes 2.1 units by weight of silica (e.g. by decomposing zircon) per unit weight addition of Ca0 in the calcium bearing additive. The phase has the added advantage of being relatively inert to leaching. Hence, for applications in which calcium contained in the final product is not deleterious and may be advantageous to its properties, leach conditions may be established under which calcium is not removed from the product. In this manner reagent consumption in leaching may be significantly reduced with no detriment to the removal of radionuclides in leaching.

While leach liquors from the presently described process may be treated or disposed of by any acceptable and suitable manner one method of treatment is herein disclosed as being particularly suitable and having special merit for stabilisation of radioactive elements.

According to this method, which is particularly applicable to liquors derived from chloride leaching of thermally treated zircon, although no limited in scope to chloride liquors, the liquors are thermally treated, e.g. by spray roasting, to bring about thermal dissociation (pyrohydrolysis) of salts present therein for the regeneration of acid forming vapour and formation of a radioactive bearing oxide.

Prior to thermal treatment of leach liquors addition of further metal salts, either by direct addition or by dissolution of metal or metal compounds in the acid liquor, may be made. In particular the acid liquors from leaching may continue on to subsequent use, such as metal pickling or leaching of metal compounds from other minerals, for example as in upgrading of ilmenite minerals to synthetic futile.

Pyrohydrolysis of leach liquors may be enhanced by addition of sulphate salts or sulphuric acid in small quantities to the leach liquors prior to thermal decomposition. The radionuclides may also be concentrated in the leach liquor before thermal treatment by any suitable method e.g. by evaporation, ion exchange, solvent extraction, membrane extraction or reverse osmosis.

In another suitable and effective method for treatment of leach liquors the leach liquors may be neutralised, e.g. by addition of basic metal oxides or hydroxides as solids, in suspension or in solution. Metal salts and barium and/or sulphate salts or sulphuric acid may also be added prior to or after neutralisation. In this manner a suspension of radionuclide bearing solids in a salt solution is formed. Separation of the solids from the liquids can then be achieved by any suitable means, e.g. thickener filtration and washing. The radionuclide bearing solids can then be either directly disposed of or roasted for further stabilisation prior to disposal. The radionuclides may also be concentrated in the leach liquor before such treatment by any suitable method, as indicated above.

The following examples and comparative examples further illustrate the invention:

EXAMPLE 1

Zircon having the composition and size distribution provided in Table 2, with total radioactivity measured at 130 Bq/g (i.e. at secular equilibrium) was subjected to leaching with refluxing 20% hydrochloric acid under violent agitation for six hours (Test A).

TABLE 2

Composition of Zircon Used in Examples 1–4

| | wt % |
|---|---|
| $ZrO_2$ | 64.30 |
| $HfO_2$ | 1.40 |
| $SiO_2$ | 32.50 |
| $P_2O_5$ | 0.30 |
| $Y_2O_3$ | 0.31 |
| $La_2O_3$ | 0.006 |
| $CeO_2$ | 0.012 |
| $TiO_2$ | 0.11 |
| $Fe_2O_3$ | 0.14 |
| $Al_2O_3$ | 0.13 |
| $V_2O_5$ | 0.11 |
| CaO | 0.022 |
| MgO | 0.033 |
| $U_3O_8$ | 0.071 |
| $ThO_2$ | 0.066 |

Size Distribution

| Size (μm) | Cum % Passing |
|---|---|
| 50 | 90 |
| 40 | 37 |
| 30 | 4 |
| 20 | 1 |

At the end of this trial the leached-zircon was separated from the leach liquors by filtration and washing. The zircon was then dried and analysed for uranium and thorium and by gamma (only) spectroscopy. Gamma spectroscopy was repeated at weekly intervals for several weeks. The results of the analyses are provided in Table 3.

The zircon of Table 2 was ground to the particle size distribution provided in Table 3, and the above treatment was repeated on the ground material (Test B).

TABLE 3

Size Distribution of Ground Zircon of Example 1

| Size (μm) | Cum % Passing |
|---|---|
| 30 | 88 |
| 20 | 72 |
| 10 | 49 |
| 5 | 34 |
| 1 | 11 |

The results of this test are also provided in Table 4.

Zircon (as per Table 2) was also subjected to a pressure leach with 20% hydrochloric acid at 150° C., followed by filtration, washing and drying (Test C). The results of Test C are provided in Table 3 for comparison with other tests

TABLE 4

Chemical and Radiometric Analyses of Leached Zircons of Example 1

| | Gross Gamma Activity Bq/g | $U_3O_8$ | $ThO_2$ | $ZrO_2$ |
|---|---|---|---|---|
| As received | 73 | 0.071 | 0.066 | 64.3 |
| Test A | | | | |
| - 24 hours | 66 | 0.068 | 0.044 | 63.3 |
| - 1 week | 64 | | | |
| - 2 weeks | 65 | | | |
| - 3 weeks (after leach) | 65 | | | |
| Test B (ground) | | | | |
| - 24 hours | 66 | 0.065 | 0.037 | 63.1 |
| - 1 week | 65 | | | |
| - 2 weeks | 64 | | | |
| - 3 weeks (after leach) | 58 | | | |
| Test C (ground) | | | | |
| - 24 hours | 59 | 0.068 | 0.046 | 60.1 |
| - 1 week | 60 | | | |
| - 2 weeks | 63 | | | |
| - 3 weeks (after leach) | 58 | | | |

The results in Table 3 confirm that acid leaching of zircon is not an effective means for significant removal of radioactivity, although some removal of thorium has been identified.

EXAMPLE 2

Briquettes of the zircon of Table 2 of two types were produced by admixing the zircon with 13% by weight and 25% by weight (on a post-mixed basis) of lime respectively and 8% by weight of moisture, forming the mixtures into 25 mm diameter, 10 mm high cylinders and allowing the cylinders to harden.

Each type of briquette was fired at 1400° C. for one hour, and then allowed to cool slowly to room temperature. The briquettes where then crushed to passing 2.5 mm and leached with refluxing excess 20 wt % hydrochloric acid for 6 hours. The leached residue was then dried and analysed for uranium and thorium and by gamma spectroscopy. The results of analyses on roasted and leached products for each type of briquette are summarised in Table 5.

TABLE 5

Chemical and Radiometric Analyses of Roasted and Leached Zircons of Example 2

| | Gross Gamma Activity | wt % | | | | |
|---|---|---|---|---|---|---|
| | Bq/g | $U_3O_8$ | $ThO_2$ | $ZrO_2$ | $SiO_2$ | CaO |
| As received | 73 | 0.071 | 0.066 | 64.3 | 32.5 | 0.022 |
| 13% CaO Test Roasted* | | | | | | |
| - 24 hours | 24 | 0.061 | 0.059 | 56.1 | 28.4 | 13.0 |

TABLE 5-continued

Chemical and Radiometric Analyses of Roasted and Leached Zircons of Example 2

| | Gross Gamma Activity | wt % | | | | |
|---|---|---|---|---|---|---|
| | Bq/g | $U_3O_8$ | $ThO_2$ | $ZrO_2$ | $SiO_2$ | CaO |
| (after roast) | | | | | | |
| Leached | 8.5 | 0.037 | 0.039 | 63.9 | 32.0 | 3.01 |
| - 4 weeks | 9.0 | — | — | — | — | — |
| (after leach) | | | | | | |
| 25% CaO Test | | | | | | |
| Roasted** | | | | | | |
| - 24 hours | 27 | 0.039 | 0.052 | 48.0 | 24.5 | 25.0 |
| Leached | | | | | | |
| - 24 hours | 9.0 | 0.049 | 0.027 | 63.7 | 32.1 | 6.57 |
| - 4 weeks (after leach) | 21 | — | — | — | — | — |

*(Note: X-ray diffraction indicated zircon, zirconia and $Ca_2ZrSi_4O_{12}$)
**(Note; X-ray diffraction indicated zirconia and $Ca_3ZrSi_2O_9$)
The results in Table 5 indicate that the roast/leach The results in Table 5 indicate that the roast/leach treatment has been extremely effective for the removal of radioactives, yet without significant removal of zirconia or silica. The gross gamma radiation levels after roasting are consistent with complete release of trapped radon gas from the zircon during thermal decomposition. Such removal is not expected to result in sustained reduction in activity levels, as much of the radon is quickly reestablished (over 5–10 days) by further radioactive decay. However, the reduction in levels of activity after leaving is consistent with complete removal of virtually all radionuclides, with the exception of residual levels of uranium-238 and thorium-232.

Further decay to produce radioactive progeny is not expected to result in final total (alpha plus beta) activity of greater than about 30 Bq/g, established over about 70 days.

This final activity level is about 15% of the original activity.

Of further interest in the X-Ray Diffraction results on roasted products (Table 5) is the observation that in the case of the test with 25% CaO addition, the composition of the phases detected cannot account for the proportions of the original components. Photomicrographs of each roasted product indicated the presence of a glassy phase (liquid under the conditions of roasting) which accounted for the departure of the X-Ray detected phases from the range of compositions defined by inputs. The glassy phase was extinguished substantially upon leaching, all other phases remaining.

EXAMPLE 3

The leach residue of the test in example 2 for which 13% CaO was added to zircon was milled to 100% passing 20 µm, and then subjected to a repeated identical leach to that of example 2. While no further significant removal of uranium, thorium or total gamma activity was achieved the calcium oxide level in the final leach residue was 0.20%, indicating that additive removal can be achieved if desired by simple fine milling prior to leaching.

EXAMPLE 4

This example illustrates the effect of the formation of a small amount of liquid phase during thermal processing on the thermally processed product and the effectiveness of the disclosed process.

The first test of Example 2 (13% CaO addition) was repeated, with the exception that roasting was conducted at a lightly lower temperature (1350° C.). No glassy phase was detected in the product of roasting in this case.

X-ray diffraction analysis of the thermally treated material indicated the presence of $CaSiO_3$, zirconia and zircon, i.e. the detected phase assemblage was consistent with the original composition.

Table 6 provides other results of the test.

TABLE 6

Chemical and Radiometric Analyses of Roasted and leached Zircon of Example 4

| | Gross Gamma Activity Bq/g | $U_3O_8$ | $ThO_2$ | $ZrO_2$ | $SiO_2$ | CaO |
|---|---|---|---|---|---|---|
| As received | 73 | 0.071 | 0.066 | 64.3 | 32.5 | 0.022 |
| 13% CaO Test | | | | | | |
| Leached-1 week after leach | 30 | 0.063 | 0.041 | 64.0 | 30.7 | 0.27 |

Clearly residual gamma activity is higher than for the similar test conducted with thermal processing at 1400° C. with partial liquid phase formation. Uranium and thorium removal has also been less effective.

For the level of CaO addition employed zircon breakdown will be greater, and gamma reduction more effective if $2CaO \cdot ZrO_2 \cdot 4SiO_2$ is formed rather than $CaSiO_3$. Further, long term equilibration tests indicate that $2CaO \cdot ZrO_2 \cdot 4SiO_2$ is the most stable product both at 1350° C. and 1400° C. The formation of a small amount of liquid phase apparently significantly enhances elemental redistribution in the approach to the desired equilibrium assemblage.

EXAMPLE 5

This example illustrates the role of the formation of a small quantity of liquid phase and the presence of a zirconia phase in the redistribution and ultimate removal of uranium and thorium.

Zircon having the analysis provided in Table 7 was micronised (80% passing 4.7 µm) and mixed in a pestle and mortar with chemical grade calcium carbonate to have the effect of the addition of 10% CaO (per unit zircon).

TABLE 7

Analysis of Zircon of Example 5

| | Wt % |
|---|---|
| $ZrO_2$ | 65.0 |
| $HfO_2$ | 1.35 |
| $SiO_2$ | 32.1 |
| $P_2O_5$ | 0.26 |
| $Y_2O_3$ | 0.27 |
| $Al_2O_3$ | 0.18 |
| $Fe_2O_3$ | 0.05 |
| $TiO_2$ | 0.02 |
| CaO | 0.02 |
| $CeO_2$ | 0.008 |
| $U_3O_8$ | 0.054 |
| $ThO_2$ | 0.052 |

The mixture was formed into pellets as per previous work. The pellets were fired at 1400° C. for 6 hours and then quenched. Electron microprobe analysis for uranium and thorium was performed on the various phases identified in the roasted product (viz zircon, zirconia, $2CaO \cdot ZrO_2 \cdot 4SiO_2$ and a glassy phase).

The large zirconia phase was found to contain approximately 0.12% $U_3O_8$, i.e. was acting as a sink for uranium (at 0.05% in feed). The presence of the zirconia phase was hence identified as the main reason for poor uranium removal in the previously reported leach tests. The glassy phase was similarly identified as a sink for thorium, thus accounting for the grater ease of thorium removal in leaching.

The quenched briquettes were crushed to pass a 250 μm screen and then leached at 3% w/v in 5M HCI for 16 hours. The results of the treatments are summarised in Table 9.

TABLE 9

Results of Testwork of Examle 6

| Sample | Gross Gamma Activity (Bq/g) | wt % $U_3O_8$ | $ThO_2$ | $ZrO_2$ | $SiO_2$ | CaO | MgO | XRD |
|---|---|---|---|---|---|---|---|---|
| As received | 73 | 0.076 | 0.069 | 64.7 | 32.5 | 0.022 | — | (roast product) |
| Leach residue (1 Week after test) | | | | | | | | |
| Test A | 13 | 0.057 | 0.040 | 57.0 | 30.1 | 5.6 | 0.02 | $Ca_2ZrSi_4O_{12}$ +$ZrSiO_4$ +$ZrO_2$ |
| Test B | 20 | 0.045 | 0.018 | 66.9 | 28.7 | 0.06 | 0.02 | $ZrSiO_4$ +$ZrO_2$ |
| Test C | 25 | 0.049 | 0.028 | 65.8 | 29.1 | 0.06 | 0.03 | $ZrSiO_4$ +$ZrO_2$ |
| Test D | 45 | 0.063 | 0.065 | 65.7 | 29.1 | 0.03 | 0.06 | $ZrSiO_4$ +$ZrO_2$ +$Mg_2SiO_4$ |

A similar preparation was conducted for a mixture to produce the ratio of input materials (weight basis) zircon, Ca0 and $Si0_2$ of 0.5:0.2:0.3. Chemical grade silica was used. After thermal processing, as above the major phases of zircon, $2Ca0·Zr0_2·4SiO_2$ and a glassy phase were identified, i.e. the zirconia phase had been extinguished by the addition of silica.

Electron microprobe analysis indicated that in the absence of the zirconia phase approximately 50% of both uranium and thorium in feed zircon had transferred to the glassy phase, which exhibited 0.2–0.3% of each element as oxides ($U_3O_8$ and $ThO_2$).

Since the glassy phase is leachable, and uranium and thorium in the glassy phase have been removed upon leaching (see example 2) the extinction of zirconia as a phase enhances radionuclide removal by deportment to the glassy phase.

EXAMPLE 6

The zircon whose analysis is provided in Table 9 ("as received") was carefully admixed with chemically pure lime or magnesia (or both) in the proportions given in Table 8, and formed into briquettes (25 mm diameter) with addition of 8% water. The briquettes were dried and then heated to 1400° C. for four hours, after which they were water quenched.

TABLE 8

Additives for Testwork of Example 6

| Test | Moles CaO/mole $ZrO_2$ | Moles MgO/mole $ZrO_2$ |
|---|---|---|
| A | 0.5 | 0 |
| B | 0.375 | 0.125 |
| C | 0.25 | 0.25 |
| D | 0 | 1.0 |

A number of observations may be made from the results of these tests. The direct substitution of magnesium for calcium as additive into thermal processing results in less effective reduction in radioactivity, although providing enhanced thorium removal. X-ray diffraction results indicated that a glassy phase is encouraged in preference to $Ca_2ZrSi_4O_{12}$ for initial replacement of calcium by magnesium. Where magnesia is added alone forsterite ($Mg_2SiO_4$) is formed. Silica removal in leaching is associated with the formation of these phases (glass and forsterite). Thorium removal is correlated with silica removal where a glassy phase is formed in thermal processing, as would be expected from the previously identified (Example 5) deportment of thorium to the glassy phase and the susceptibility of the glassy phase to leaching. The amount of glassy phase formed under the conditions of this work is a strong function of temperature, with even 5° C. temperature difference resulting in a noticeable effect on the amount of the glassy phase.

The discouragement of the $Ca_2ZrSi_4O_{12}$ phase by addition of magnesia into thermal processing has had the beneficial impact of allowing effectively complete removal of Calcium and magnesium from the final leached product, which then has a composition which is close to that of the original zircon.

EXAMPLE 7

This example illustrates the use of pyrohydrolysis of leach liquors for the production of a solid radioactive waste which is stable to groundwater leaching.

Leach and wash liquors were produced by hydrochloric acid leaching of a thermally treated mixture of industrial lime (10%) and zircon. The composition of the combined liquors given in Table 10.

TABLE 10

| Leach Liquor analysis of example 7 | |
|---|---|
| | g $L^{-1}$ |
| Zr | 2.01 |
| Hf | 0.062 |
| Si | 0.058 |
| Ti | 0.064 |
| Fe | 0.25 |
| Ca | 6.50 |
| U | 0.038 |
| Th | 0.070 |
| Al | 0.43 |
| Y | 0.17 |
| Mg | 0.17 |
| | Bq/mL |
| U-238 | 0.56 |
| Ra-226 | 0.84 |
| Pb-214 | 0.83 |
| Bi-214 | 0.80 |
| Pb-210 | 1.02 |
| Ac-228 | 0.29 |
| Pb-212 | 0.13 |
| Tl-208 | 0.24 |

To 0.6 litres of the liquor of Table 10 8.5 g of concentrated sulphuric acid was added to precipitate gypsum and regenerate hydrochloric acid. The resulting solution was evaporated to dryness. The solid residue was then roasted in a flow of steam for 2 hours at 200° C. followed by roasting in steam for 2 hours at 800° C. The solids product weighed 12.2 g.

After cooling to room temperature in air the roasted solids were leached at 65 $L^{-1}$ for 24 hours in simulated groundwater (5g $L^{-1}$NaCl, 0.5 g $H_2SO_4$), with pH maintained at about 3. Radiometric analysis (T-spectroscopy) of the 3 week old leach liquors is provided in Table 11. Clearly, within the accuracy of the analysis negligible extraction of radionuclides into the simulated groundwater has occurred.

TABLE 11

| Liquors From Simulated Groundwater Leach of Example 7 | |
|---|---|
| | Bq/mL |
| U-238 | 0.004 |
| Ra-226 | 0.015 |
| Pb-214 | 0.007 |
| Bi-214 | 0.022 |
| Pb-210 | 0.003 |
| Ac-228 | 0.001 |
| Pb-212 | 0.002 |
| Tl-208 | 0.022 |

We claim:

1. A process for reducing the content of radioactive components in a zircon concentrate which process comprises the steps of:

(i) heating the zircon concentrate in the presence of an additive and under conditions that are capable of causing zircon to at least partially decompose;

(ii) cooling the product of step (i);

(iii) subjecting the product of step (ii) to chemical treatment for lixiviation of radionuclides contained in the product of step (ii), so as to thereby remove at least a portion of the radioactive components present in the product of step (ii) by dissolving them but without necessarily significant removal of zirconia or silica; and (iv) recovering zirconia and silica from the product of step (iii).

2. A process according to claim 1 wherein the zircon decomposes at least in part to zirconia and another silica bearing phase.

3. A process according to either claim 1 or claim 2 wherein conditions selected for steps (i) and (iii) result in at least partial removal of the additive during step (iii).

4. A process according to claim 1 wherein the additive is a compound capable of forming a silicate with silica when heated to elevated temperatures.

5. A process according to claim 1 wherein the additive is silica or a flux,

6. A process according to claim 4 wherein the additive is one or more oxides of group I or group II of the Periodic Table.

7. A process according to claim 4 wherein the additive comprises calcium oxide,

8. A process according to claim 7 wherein reaction conditions are selected for step (i) which promote the formation of a phase comprising $Ca_2ZrSi_4O_{12}$.

9. A process according to claim 7 wherein reaction conditions are selected for step (i) that promote the formation of a glassy phase as well as a phase comprising $Ca_2ZrSi_4O_{12}$.

10. A process according to claim 4 wherein the additive comprises magnesium oxide.

11. A process according to claim 10 wherein the additive comprises calcium oxide and magnesium oxide in proportions that promote the formation of a glassy phase in preference to a $Ca_2ZrSi_4O_{12}$ phase.

12. A process according to claim 1 wherein step (i) of the process is performed at a temperature in the range from 800° C. to 1800° C.

13. A process according to claim 1 wherein step (i) is performed under conditions selected to avoid the formation of a zirconia phase.

14. A process according to claim 13 wherein sufficient silica is added to the zircon to restrict the formation of a zirconia phase during step (i).

15. A process according to claim 1 wherein no more than 20% by weight of the additive is incorporated into the zircon.

16. A process according to claim 15 wherein 5 to 15% by weight of the additive is incorporated into the zircon.

17. A process according to claim 1 wherein more than 20% of the additive is incorporated into the zircon.

18. A process according to claim 1 wherein step (iii) comprises leaching with a mineral or organic acid.

19. A process according to claim 18 wherein step (iii) is performed at a leaching temperature in the range from 20° to 150° C.

20. A process according to claim 18 wherein the acid is selected from the group consisting of hydrochloric, nitric and strong organic acids.

21. A processing according to claim 20 including the additional steps of:

(v) washing the product of step (iv);

(vi) drying and calcining the product of step (v) for removal of retained moisture and production of a dry powdered product having a similar composition to the original zircon concentrate, but with significant reduction in the level of radioactivity; and (vii) regenerating acid and/or stabilisation of separated radionuclides in a solid waste form.

22. A process according to claim 20 including the step of spray roasting leach liquors from step (iii) to cause thermal dissociation of salts present therein to form oxides of radioactive bearing elements.

23. A process according to claim 22 including the step of adding small quantities of sulphate salts or sulphuric acid prior to spray roasting.

24. A process according to claim 20 including the step of neutralizing acidic leach liquors derived from step (iii) by addition of basic metal oxides and recovering radionuclide solids therefrom.

25. A process according to claim 24 including the step of adding metal salts and barium and/or sulphate salts or sulphuric acid prior to or after neutralization.

26. A process according to claim 24 including the step of roasting the recovered radionuclide solids.

27. A product containing zirconia produced by the process of any one of claims 1 to 26.

* * * * *

UNITED STATES PATENT AND TRADEMARK OFFICE
CERTIFICATE OF CORRECTION

PATENT NO. : 5,478,538
DATED : December 26, 1995
INVENTOR(S) : Michael J. Hollitt, et al.

It is certified that error appears in the above-identified patent and that said Letters Patent is hereby corrected as shown below:

Col. 1, line 11, "zircon:" should be --zircon;--

Col. 2, line 20, "mSV" should be --mSv--

Col. 2 line 48, "(e.g. at 150 C.)" should be --(e.g. at 150 C)--

Col. 4, line 41, "1800 C." should be --1800 C--

Col. 5, line 21, "300 C." should be --300 C--

Col. 5, line 31, "20 -150 C.," should be --20 -150 C,--

Col. 5, line 54, "300 C.-900 C." should be --300 C-900 C--

Col. 6, line 54, "futile" should be --rutile--

Col. 8, line 2, "150 C.," should be --150 C,--

Col. 8, line 4, "other test" should be --other tests.--

Col. 9, line 19, "21" should be --11--

Col. 10, line 30 "CaSio3" should be --CaSiO3--

Col. 10, line 32, "1350 C." should be --1350 C--

UNITED STATES PATENT AND TRADEMARK OFFICE

CERTIFICATE OF CORRECTION

PATENT NO. : 5,478,538

DATED : December 26, 1995

INVENTOR(S) : Michael J. Hollitt, et al.

It is certified that error appears in the above-indentified patent and that said Letters Patent is hereby corrected as shown below:

Col. 10, line 63, "1400° C." should be --1400° C--

Col. 11, line 7, "grater" should be --greater--

Col. 11, line 56, "1400° C." should be --1400° C--

Col. 12, line 50, "5 C." should be --5 C--

Col. 12, line 57, "Calcium" should be --calcium--

Col. 13, line 4, "liquors given" should be --liquors is given--

Col. 14, line 19, "or a flux," should be --or a flux.--

UNITED STATES PATENT AND TRADEMARK OFFICE

CERTIFICATE OF CORRECTION

PATENT NO. : 5,478,538

DATED : December 26, 1995

INVENTOR(S) : Michael J. Hollitt, et al.

It is certified that error appears in the above-indentified patent and that said Letters Patent is hereby corrected as shown below:

Col. 14, line 24, "oxide," should be --oxide.--

Col. 14, line 41 "c." should be --C--

Cover of Patent, first column, "PCT Filed: Nov. 15, 1992" should be --PCT Filed: April 15, 1992 --

Signed and Sealed this

Twenty-fifth Day of November, 1997

*Attest:*

BRUCE LEHMAN

*Attesting Officer* *Commissioner of Patents and Trademarks*